Figure 1:
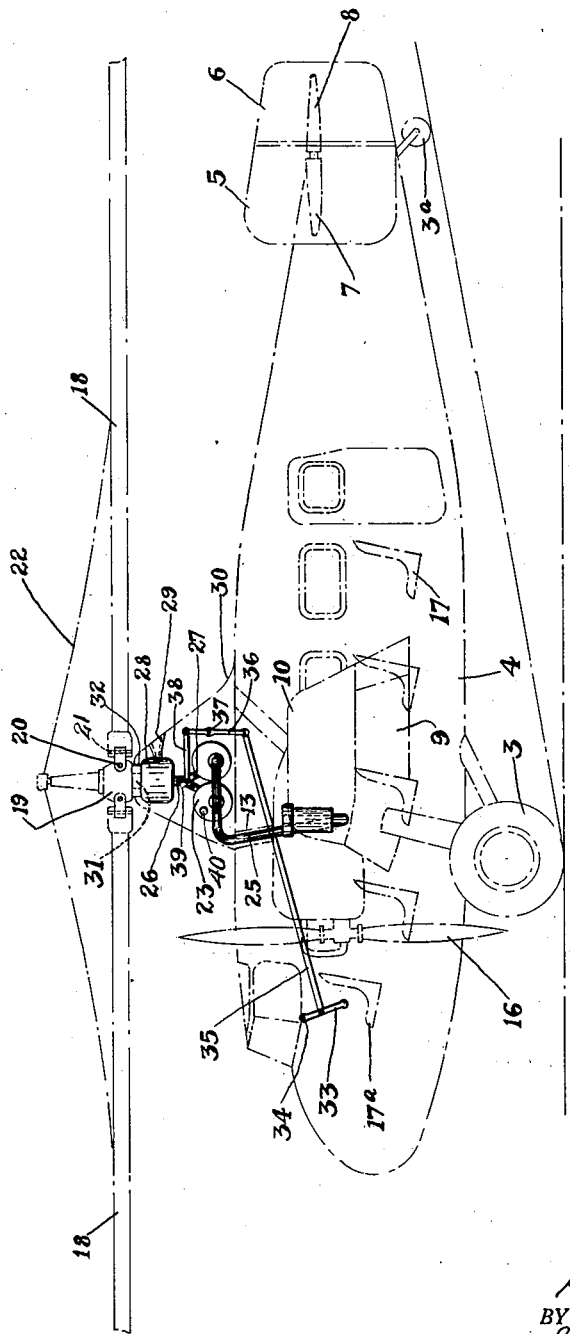

Nov. 20, 1934.    H. S. CAMPBELL    1,980,980
AIRCRAFT HAVING SUSTAINING ROTORS AND METHOD OF OPERATING THE SAME
Filed Sept. 23, 1931    2 Sheets-Sheet 1

INVENTOR.
Harris S. Campbell
BY
Synnestvedt + Lechner
ATTORNEYS.

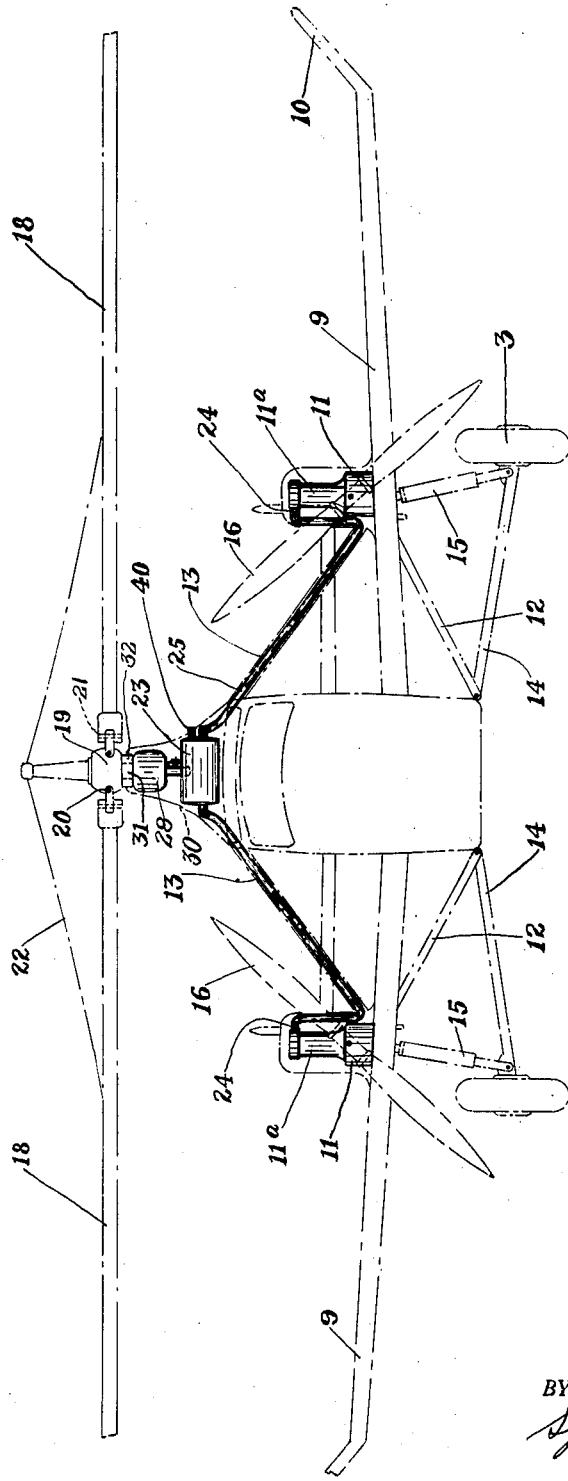

Patented Nov. 20, 1934

1,980,980

UNITED STATES PATENT OFFICE 1,980,980

AIRCRAFT HAVING SUSTAINING ROTORS AND METHOD OF OPERATING THE SAME

Harris S. Campbell, Hatboro, Pa., assignor to Autogiro Company of America, Philadelphia, Pa., a corporation of Delaware Application September 23, 1931, Serial No. 564,484

7 Claims. (Cl. 244—19)

This invention relates to aircraft having sustaining rotors, and is especially concerned with craft in which the sustaining rotor includes a plurality of blades or wings which are pivoted to a central hub or head structure which is arranged for free rotation under the influence of relative airflow in flight.

Generally considered, this invention has relation to a novel means for driving or imparting torque to the sustaining rotor, the said means being particularly useful for the purpose of initiating rotation of the various blades of which the rotor is composed, prior to takeoff from the ground. In addition, the invention contemplates a novel method of operating an aircraft of the rotative blade type, the said method including utilization of the forward propulsion means to actuate the rotor in a novel manner, as will appear more fully hereinafter.

In its broad aspect, the invention has in view simplification of the rotor driving mechanism and arrangement thereof in such manner that the aerodynamic efficiency of the craft as a whole is considerably enhanced.

A further more or less general object of the invention is involved in the utilization of a minimum number of operating parts and the like, such parts additionally being of relatively light weight so that the total weight of the craft is not materially increased by application of my starter thereto.

More specifically, this invention makes provision for utilizing compressed gas or gas pressure to operate a motor device which is coupled with the rotor. The arrangement herein disclosed provides for transmission of fluid pressure from a cylinder or cylinders of an engine or engines of the craft (which normally serve as the forward propulsion means) to supply the gas pressure by which the motor device is operated. In this way, the addition of only relatively few and simple parts is necessary in order to apply the structure of my invention to existing equipment.

A further object of this invention resides in the disposition of a major portion of the rotor driving or starter parts within a streamlined casing or structure which is disposed above the body of the craft for the purpose of supporting the rotor. This invention, therefore, provides for efficient cooperation of the rotor supporting means and the driving or starter parts, it being noted that the supporting means, for example, as described and claimed in the copending application, Serial No. 541,200, filed June 1st, 1931, of Harold F. Pitcairn, assignor to the assignee of this application, may be of the cantilever type, including a single major hollow supporting structure within which the starter is mounted.

Still further, this invention is especially useful, particularly when associated with a rotor mount of the type referred to, in combination with a craft of the closed body or cabin type, since the starter or rotor driving parts may conveniently be disposed above the body to be enclosed within the streamlined rotor supporting structure which may be faired into the upper surface of the body or cabin.

In addition to the foregoing, this invention provides for convenient transfer of compressed gas from a pair of engines mounted in spaced relation at the two sides of the body of the craft to the starter parts which are arranged as above described.

Additional objects and advantages of the construction herein disclosed will be more apparent from a consideration of the following description making reference to the accompanying drawings, in which—

Figure 1 is a somewhat diagrammatic side view of an aircraft having a sustaining rotor to which the rotor driving or starting means of this invention has been applied; and Figure 2 is a somewhat diagrammatic front view of the craft of Figure 1.

In referring to the drawings, attention is first called to the disposition of landing mechanism including undercarriage wheels 3 and a tail wheel 3a below the body or cabin 4. Suitable fixed and controllable empennage surfaces 5, 6, 7 and 8 may also be provided and, at the sides of the craft, the supplemental fixed wings 9 are arranged, these wings having upturned tip portions 10.

As best seen in Figure 2, the craft is equipped with a pair of engines 11—11 which are mounted on the wing structures 9 somewhat spaced from the cabin and which, together with the wings themselves, may be interbraced with the body by means of the diagonal struts 12—12 and 13—13. Struts 14—14 serve to carry the landing wheels 3 and the landing shocks are absorbed by means of absorbers 15—15 which depend from the wings 9 to be connected with the struts 14 adjacent to the wheels 3. Each engine, of course, is equipped with a propeller 16.

Any suitable seating arrangements 17 may be disposed within the cabin, these arrangements including a pilot's seat 17a.

The rotor itself is illustrated as including a plurality of blades 18 (only two are shown but it is to be understood that any desired number may be employed) which are pivoted or articulated to the central hub structure 19 on horizontally disposed pivot pins 20 as well as vertically disposed pivot pins 21. An upward extension may be arranged above the hub 19 for the purpose of supporting "droop" cables 22, the latter of which are used to support the blades when they are inactive or rotating at relatively slow speeds.

The starter mechanism includes one or more compression tanks 23 (two being here shown) which are arranged to receive their supply from a single cylinder 11a of each one of the forward propulsion engines. For this purpose a valve 24 may be associated with each one of the cylinders 11a to open just after firing or explosion of the charge. These valves thus control the transfer or passage of gas to the tanks 23 through suitable connections 25.

In the preferred arrangement, the connections or pipes 25 are extended within the bracing struts 13 or their fairing and, indeed, if desired, these struts themselves may be utilized as conduits through which the gas is transferred from the engines to the tanks 23.

While the two tanks 23 may be arranged to come into operation successively, they are here shown connected to discharge into a common pipe 26 (through branch pipes 27) which communicates with the motor 28. The motor, of course, may be of any suitable fluid pressure operable type and is provided with a discharge passage 29 extended rearwardly and out of the rotor mounting structure 30. If desired gearing might be introduced between the motor and the rotor. By reference to the drawings, it will be seen that this mounting structure completely encloses all of the driving or starter parts which are disposed above the cabin of the craft so that parasite drag and the like are kept at a minimum. The connection to the rotor may be effected by means of the shaft 31 which is extended through the fixed socket or bearing structure 32, the latter being rigidly mounted at the top or upper end of the pylon 30.

Control of the starter is provided for by means of a manually operable lever 33 pivoted as at 34 adjacent to the pilot's seat 17a. An operating rod or connection 35 extends from this lever rearwardly for connection with another lever 36 at one side of the pivot 37 of the latter. An additional link 38 connects the lever 36 with an operating part 39 for a valve arranged in the gas feed line or pipe 26.

Before considering the operation of the above construction, it should be noted that the valves 24 associated with the cylinders 11a, in addition to being arranged to open just after firing of the charge, are preferably of the one-way type, loaded by springs or any other suitable means in such manner that they open only under the influence of pressure in the cylinder which is, for example, fifteen pounds per square inch higher than the pressure existing in the reservoir tanks 23. Thus, the valves may be arranged to admit gas to the tanks under the compressive action of the pistons in the cylinders as well as under the influence of explosion in the cylinders. In this way, after initiating rotation of the sustaining blades, the gases transferred from the cylinders 11a will shortly replenish the supply in the tanks 23, after which the valves 24 automatically are retained in their closed positions so that the engines again operate normally or with all the cylinders thereof.

When it is desired to start or drive the rotor, the control lever 33 is manipulated by the pilot to open communication between the supply tanks 23 and the motor 28. The admission of pressure to the motor, of course, drives the rotor blades and when they have acquired the necessary or desired speed of rotation, a takeoff may be made. The control 33 may then be manipulated to close communication between the tanks 23 and the motor 28 and, in the manner described above, the cylinders 11a will replenish the supply in the tanks 23 and then function normally in the forward propulsion of the craft.

A safety or blow-off valve 40 may also be applied to one or both of the intercommunicating tanks 23 and is preferably arranged to discharge externally of the enclosing structure 30.

According to the foregoing an efficient, simple and dependable rotor driving or starter mechanism is provided, particular attention being called to the fact that a high degree of efficiency is obtainable since no auxiliary compressors or the like need be employed. The use of cylinders of the engines normally provided for forward propulsion is, of course, largely responsible for this efficiency and, in this connection, it is observed that relatively high pressures are readily obtainable from such cylinders, so that with tanks and an operating motor of suitable character, relatively great power is produced even though the tanks and the motor as well as other parts are of relatively small size and weight.

The structure, furthermore, is highly advantageous in view of the fact that it does not require or necessitate the disposition of rotor starter or driving parts within the cabin of the craft itself. Additionally, the use of a plurality of supply tanks 23 is of advantage since adequate capacity may readily be provided in spite of the fact that the various parts are mounted within a chamber which is very materially limited as to configuration as well as space. Furthermore, and more specifically, the arrangement of a plurality of relatively small diameter reservoirs or tanks 23 extended generally transversely of the craft within the pylon structure 30, results in an arrangement which has the necessary strength to withstand the high pressures of the cylinder explosion gases.

Finally, and as above indicated, the arrangement provides an effective means for driving or starting the rotor, the said means being disposed, at least in large part, entirely within housings, struts or other structures with which craft of this type are normally equipped, so that the application of the various parts of the driving mechanism does not involve any increase in parasite drag, head resistance or the like.

What I claim is:—

1. In an aircraft having a sustaining rotor, an engine serving normally for forward propulsion of the craft, said engine being mounted toward one side of the craft, and fluid pressure means for driving the rotor, said means including a fluid pressure connection between the engine and another portion of the driving means disposed adjacent the rotor hub structure, together with an engine bracing strut housing, at least in large part, said fluid pressure connection.

2. In an aircraft having a sustaining rotor, an engine serving normally for forward propulsion of the craft, said engine being mounted toward one side of the craft, and means for driving the rotor, said means including power transmission means extended generally obliquely upwardly from the engine to the rotor hub mechanism, together with an engine bracing strut housing at least a portion of said transmission means.

3. In an aircraft having a sustaining rotor, an engine serving normally for forward propulsion of the craft, said engine being mounted toward one side of the craft, and means for driving the rotor, said means including power transmission means extended from the engine to the rotor hub mechanism, together with a structural brace for the aircraft extended toward a side of the craft in association with said power transmission means for purposes of streamlining.

4. In an aircraft, a body having an occupant's compartment therein, a system of pivotal and rotative sustaining blades or wings mounted above the body of the craft for normal actuation under the influence of relative air-flow in flight, a generally shell-like mounting structure for the rotor extended above the occupant's compartment therein, a fluid pressure rotor driving device and a tank adapted to contain a supply of fluid under pressure, said device and said tank being housed, at least in large part, within the said shell-like mounting structure.

5. In an aircraft, a body having an occupant's compartment therein, a sustaining rotor mounted above the body for normally free rotation under the influence of relative air-flow, the rotor including a hub structure and a plurality of wings articulated thereto to provide freedom for oscillative or pivotal movements in flight, a hollow generally upright mounting structure for the rotor interconnecting the body of the craft and the rotor hub, forward propulsion means for the craft including an engine offset from the rotor axis toward one side of the body of the craft, and a mechanism for starting the rotor including power transmission means extended from the engine to the rotor at least partially internally of said generally upright mounting structure for connection with the rotor hub internally of the mounting structure.

6. For an aircraft having a multi-cylinder internal combustion forward propulsion engine and a wind driven sustaining rotor mounted above the body of the craft; a mechanism for imparting a starting torque to the rotor including a fluid pressure operated motor device associated with the rotor hub, and controllable means for conveying fluid pressure from a cylinder of said engine to said motor device, whereby, in initiating rotation of the rotor, a cylinder of said engine serves to supply fluid pressure to said motor device while other cylinders thereof continue the operation of the engine and whereby the full power of all cylinders of said engine is utilized after initiation of rotation of said rotor for purposes of take-off and flight.

7. In an aircraft, a sustaining rotor having a hub providing a generally upright axis, a mounting structure connected with the hub and with the body of the craft arranged to position the rotor above the body of the craft, an engine serving normally for forward propulsion of the craft, said engine being horizontally offset from the axis of the rotor hub, and means for driving the rotor including power transmission means extended from the engine to the rotor hub, together with a hollow stress carrying structural element for the aircraft extended from said mounting structure toward said engine and housing at least a portion of said power transmission means.

HARRIS S. CAMPBELL.